United States Patent [19]

Koyama et al.

[11] Patent Number: 5,143,554

[45] Date of Patent: Sep. 1, 1992

[54] PROCESS FOR WASHING POWDERY AND/OR GRANULAR RESINS AND A WASHING DEVICE THEREFOR

[75] Inventors: Yoshinari Koyama; Daigo Shirota, both of Ichihara, Japan

[73] Assignee: Idemitsu Petrochemical Company Limited, Tokyo, Japan

[21] Appl. No.: 571,477

[22] Filed: Aug. 23, 1990

[30] Foreign Application Priority Data

Aug. 28, 1989 [JP] Japan ............................. 1-221151

[51] Int. Cl.⁵ .............................................. B08B 9/00
[52] U.S. Cl. .................................. 134/25.5; 134/32; 134/42
[58] Field of Search ........................ 134/25.5, 32, 42

[56] References Cited

U.S. PATENT DOCUMENTS

| | | |
|---|---|---|
| 2,519,781 | 8/1950 | Morris . |
| 3,539,539 | 11/1970 | Goetzke . |
| 3,849,196 | 11/1974 | Halloway et al. ............... 134/25.5 |
| 4,062,697 | 12/1977 | Egli et al. ..................... 134/25.5 |
| 4,421,874 | 12/1983 | Seefluth . |
| 4,526,684 | 7/1985 | Seefluth . |

FOREIGN PATENT DOCUMENTS 2642356  8/1990  France .
59-49233  3/1984  Japan .
61-225217  10/1986  Japan .
62-223232  10/1987  Japan .
1297606  11/1972  United Kingdom .

OTHER PUBLICATIONS

Static Mixing Handbook, published Jun. 1973.
Adhasion, vol. 16, No. 9, 1972, "Statische Mischer".
Automation, vol. 19, No. 2, 1972 "Motionless mixers".

Primary Examiner—Asok Pal
Attorney, Agent, or Firm—Nikaido, Marmelstein, Murray & Oram

[57] ABSTRACT

A process for washing a powdery and/or granular resin involves bringing the powdery and/or granular resin into contact with a washing liquid in a counterflow fashion in a tubular body with a plurality of static mixing elements disposed continuously in series, thereby removing impurities adhering to the powdery and/or granular resin and producing the powdery and/or granular resin with a less content of impurities. A washing device for use with the washing process contains a tubular body in which the static mixing elements are disposed continuously in series, and this construction is simpler than conventional ones and does not require a stirring power and mechanism to remove the impurities from the powdery and/or granular resin.

12 Claims, 2 Drawing Sheets

PROCESS FOR WASHING POWDERY AND/OR GRANULAR RESINS AND A WASHING DEVICE THEREFOR

BACKGROUND OF THE INVENTION

1. Field of the Invention

The present invention relates to a process for washing a powdery and/or granular resin and a washing device for use in the process therefor and, more particularly, to the process for washing the powdery and/or granular resin and the washing device for use in the process therefor, which are highly efficient in washing, which require simplified equipment, and which are less expensive in running cost.

2. Description of Related Art

Such a powdery and/or granular resin as being produced by polymerization processes generally contains components of low molecular weights, by-products, residues of catalysts and polymerization promoters, and solvents. In molding or forming it as it is, the powdery and/or granular resin presents drawbacks that it corrodes equipment to be used and it imparts a color. And the powdery and/or granular resin itself may suffer from the disadvantages that its properties deteriorate with a lapse of the time period and it generates bubbles upon molding. Further, when the resin containing impurities is used as a material for electrical and electronic instruments, they may cause even an error in operation. Thus, it is required that such impurities should be removed as much as possible.

Therefore, a variety of processes of washing out such impurities from the powdery and/or granular resin has heretofore been developed and applied in order to satisfy requirements for removing the impurities therefrom, however, they have problems in common that they are low in washing efficiency.

For instance, polyphenylene sulfide (PPS) in a form of powder, synthesized by polymerization, has unreacted p-dichlorobenzene (PDCB), N-methylpyrrolidone (NMP) as a solvent, sodium chloride as a by-product, a polymerization promoter, oligomers and so on adhered. Conventional processes for removing those impurities involve stirring the PPS, together with a washing liquid, by using a washing vessel with a stirring blade. The conventional processes, however, suffer from the disadvantage that the impurities cannot be removed to a sufficient extent, thereby placing the limit to an improvement in purity of the resin. They also have the problems that washing operation should be repeated plural times, i.e., three to ten times, when the products are washed in a batch system, and a plurality of washing vessels, i.e., three to ten washing vessels, should be provided when the products are washed in a continuous system using a complete mixer. Hence, those processes render equipment complicated, require expensive investment costs and causes an increase in an amount of a washing liquid to be consumed and an amount of waste to be treated as well as an increase in power for stirring, resulting in a rise of running costs.

It is also known of a process for continuously treating a slurry of the PPS with hot water by means of an indirect heat exchange, as disclosed in Japanese Patent Unexamined Publication (kokai) No. 49,233/1984. This process serves as simplifying equipment and shortening a time period for treatment, however, it has washing efficiency as low as the conventional ones in a batch system.

Further, U.S. Pat. No. 4,526,684 discloses a process which allows a slurry of the PPS to flow in a treating vessel and a washing liquid to pass through a filter mounted around the treating vessel. This process also has the drawbacks that its efficiency in washing is low, the filter clogs, and equipment is made so complicated to require a complex operation.

SUMMARY OF THE INVENTION

The present invention has been completed in the situation as described hereinabove and it has the object to provide a process for washing a powdery and/or granular resin and a washing device for use in the process therefor, which are high in washing efficiency, which require simplified equipment and low running costs, and which are ready in operation.

In order to achieve the object, an aspect of the present invention consists of the process for washing the powdery and/or granular resin characterized by bringing the powdery and/or granular resin into contact with a washing liquid in a counter flow in an tubular body with a plurality of static mixing elements disposed continuously in series. Another aspect of the present invention consists of the washing device for use in the process for washing the powdery and/or granular resin, which is characterized by a tubular body having the plurality of the static mixing elements disposed continuously in series, a supply section for feeding the powdery and/or granular resin and a discharge section for discharging a wash liquid, each section being disposed at an end portion of the tubular body, as well as a discharge section for discharging the powdery and/or granular resin and a supply section for feeding the washing liquid, each section being disposed at another end portion of the tubular body.

Other objects, features and advantages of the present invention will become apparent in the course of the description of the preferred embodiments, which follows, in conjunction with the accompanying drawings.

DESCRIPTION OF THE PREFERRED EMBODIMENTS

Figure 1:
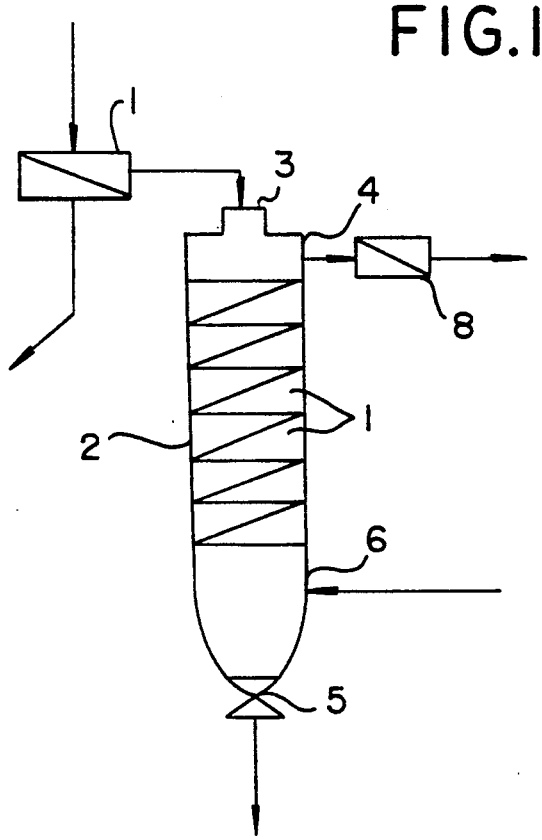
FIGS. 1 and 2 are diagrammatic representations in section, each showing a washing device for use in working examples of the washing process according to the present invention.

The present invention will be described more in detail by way of examples with reference to the accompanying drawings.

§ Powdery and/or Granular Resin

The powdery and/or granular resin to be used for the process according to the present invention is a resin which is in a powdery and/or granular state yet which is not in a bulky state. And the process for preparing the powdery and/or granular resin to be used therefor is not restricted to any particular one. Further, the powdery and/or granular resin to be used for the process according to the present invention may have such a shape as powder, particle, granule, pearl, fiber and so on, and it may be used in such a state that the shapes of the powdery and/or granular resin are mixed and that the powdery and/or granular resin is in a porous state.

It is to be noted herein that the powdery and/or granular resin which can achieve the effect of the invention highly effectively is in such a granular shape that may have an average particle size ranging from 10 to 5,000 μm, preferably from 20 to 3,000 μm. It is also preferred that the powdery and/or granular resin may have a bulk density ranging from 0.2 to 0.9 g/cm$^3$, preferably from 0.3 to 0.8 g/cm$^3$.

As described hereinabove, it is further preferred that there may be used the powdery and/or granular resin which is prepared by a process that is not restricted to a particular one. More particularly, the powdery and/or granular resin to be used for the process according to the present invention may be any one obtainable directly from a product prepared by polymerization or obtainable through a separation means, such as reprecipitation from a solution containing the polymer, or through a granulating means, or it may be a polymer in a bulky state or in a solid state or optionally in a molded state or in such a state that the resin is pulverized or finely divided.

Furthermore, the powdery and/or granular resin to be used for the process according to the present invention is not restricted to a particular kind and it may include, for example, a polyarylene sulfide, such as polyphenylene sulfide, a polyolefin, such as polyethylene, polypropylene and polybutene, a polycarbonate, a polyester, and so on. Among the resins as described hereinabove, the polyarylene sulfide such as polyphenylene sulfide is particularly preferred for achieving the remarkably high effect of the present invention.

§ Washing Liquid

As the washing liquid, there may be used a variety of solvents which do not dissolve the powdery and/or granular resin yet which dissolve the impurities which adhere to the powdery and/or granular resin. Generally, the washing liquid may include, for example, water, a hydrophilic organic solvent, a hydrophobic organic solvent, an acid solution, an alkali solution, and a mixture of two or more. The kind of the washing liquid may appropriately be chosen in accordance with the kind of the powdery and/or granular resin to be used, the kind of the impurities to be removed, the difference in specific gravity from the resin to be used, and so on. For example, water, particularly deionized water, is preferred for the polyarylene sulfide.

§ Washing Device

The washing device to be used for the process according to the present invention is a tubular body in which the static mixing elements are disposed continuously in series. The static mixing element is not restricted to a particular one and any known one can be used.

Figure 3:
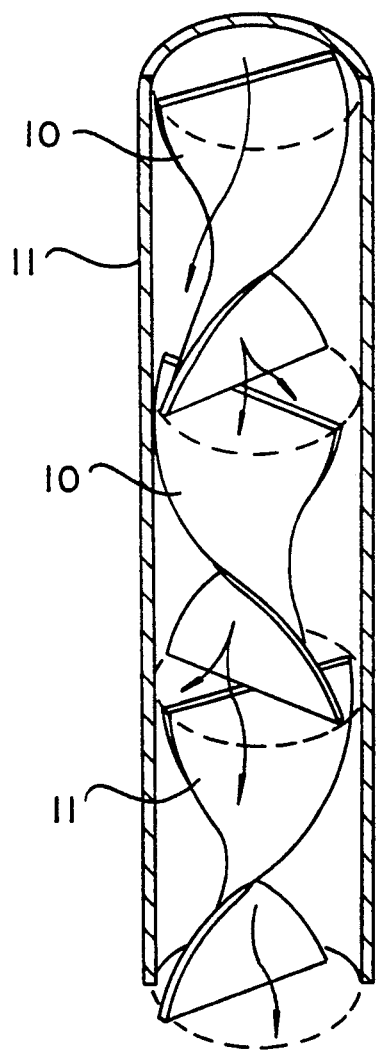
FIG. 3 is a sectional view showing the tubular body having static mixing elements disposed continuously in series.

As shown in FIG. 3, the static mixing element, such as a spiral element 10, is in a shape that its plate is constructed such that one end portion of the plate is twisted at the angle of a given angle (hereinafter referred to as a twisted angle) of 180°, for example, relative to the other end portion thereof facing the one end portion thereof. In the washing device according to the present invention, a plurality of the spiral elements 10 are disposed such that the spiral element 10 in a clockwisely twisted shape is alternately arranged with the spiral element 10 in a counterclockwisely twisted shape at a given angle (hereinafter referred to as an intersecting angle) of 90°, for example, relative to the adjacent spiral element 10.

The material from which the spiral element 10 is formed is not restricted to a particular one and may be appropriately chosen in accordance with the kind of the powdery and/or granular resin, the kind of the washing liquid or the like. The material to be used may include, for example, carbon steel, stainless steel, titanium, alloy, special metal, glass, ceramics, synthetic resin such as polyvinyl chloride, and so on. The size of the spiral element 10 may be determined on the basis of the scale on which the washing is carried out or other conditions. Furthermore, the shape of the static mixing element is not restricted to the spiral shape and maybe any shape as long as it can provide the effect of mixing the powdery and/or granular resin with the washing liquid.

When the powdery and/or granular resin passes through the tubular body with the plurality of the spiral elements 10 disposed in the manner as described hereinabove, the powdery and/or granular resin may pass through the tubular body in such a manner that it is divided into two sections by the first spiral element 10, disposed in a position closest to the supply section of the tubular body for supplying the powdery and/or granular resin, and each of the section is further divided into two additional sections by the second spiral element 10, disposed immediately adjacent the first spiral element 10. The powdery and/or granular resin passes through the tubular body while being divided in an exponential function. Further, as the spiral elements 10 are constructed such that the spiral element 10 twisted clockwisely is arranged alternately with the spiral element 10 twisted counterclockwisely, the powdery and/or granular resin which has been divided into two sections by the first spiral element 10 is further divided into two sections, i.e., into a total of four sections, by the second spiral element 10 and further that the powdery and/or granular resin which has passed in two divided sections through the first spiral element 10 passes through the second spiral element 10 in four divided sections in a direction inverted from or opposite to the direction in which the powdery and/or granular resin has passed in two sections through the first spiral element 10. The powdery and/or granular resin may further pass through an additional spiral element 10 disposed adjacent the second spiral element 10 and/or another additional spiral element or elements 10 in the same manner as described hereinabove and divided into smaller sections in an exponential function.

On the other hand, the washing liquid is fed in a counter flow relative to the powdery and/or granular resin in substantially the same manner as the powdery and/or granular resin except for the direction in which the powdery and/or granular resin passes and it is inverted. More specifically, the washing liquid is caused to pass upwardly, namely, in the direction opposite to the direction in which the powdery and/or granular resin passes, and to be inverted in the direction opposite to the direction in which the powdery and/or granular resin is divided into smaller sections while passing through the spiral element 10.

By passing the powdery and/or granular resin in a counterflow against the washing liquid through the tubular body in the manner as described hereinabove, the powdery and/or granular resin flowing in the direction in which the washing liquid flows is brought into contact with the washing liquid flowing in the direction opposite to the direction of a flow of the powdery and/or granular resin in the tubular body in an extremely homogeneous state, thereby effecting the washing to an efficient extent.

When the tubular body is used for washing operation while being disposed in a substantially horizontal posture, it requires a transfer means for forcibly transferring the powdery and/or granular resin forward through the tubular body. And a medium, such as a solvent, is also required for assisting the powdery and/or granular resin in transferring forward through the tubular body and accompanying the powdery and/or granular resin, which is identical to or similar to the washing liquid.

From the foregoing, it is preferred to use the tubular body to be disposed in a substantially vertical posture, thereby allowing the powdery and/or granular resin fed from the upper end portion of the body to descend due to gravity without any accompanying medium. In other words, the tubular body arranged in a vertical posture requires neither means for forcibly transferring the powdery and/or granular resin nor accompanying medium, thereby simplifying equipment.

Even if the powdery and/or granular resin is distributed in different particle sizes, the granules of the powdery and/or granular resin flow in the direction opposite to the direction in which the washing liquid flows so that a flow of the powdery and/or granular resin through the tubular body is close to a flow and the ability of washing the powdery and/or granular resin is not reduced even if the speeds of sedimentation of the powdery and/or granular resin would differ among the powdery and/or granular resin having different particle sizes.

Generally, the static mixer is used for mixing various substances and the substances to be mixed together are supplied to the tubular body of the static mixer from the same direction. In accordance with the present invention, however, the static mixer is used for washing the powdery and/or granular resin while the washing liquid is fed in the direction opposite to the direction in which the substance to be washed flows, namely, the two substances are flown in the tubular body of the static mixer in a counterflow fashion.

For the washing device according to the present invention, the powdery and/or granular resin advances forward through the tubular body of the washing device, while it is always brought into contact with a fresh portion of the washing liquid to be fed in the direction opposite to the direction of supply of the powdery and/or granular resin. This is particularly advantageous for improving washing efficiency.

As described hereinabove, the washing device according to the present invention has the supply section for supplying the washing liquid at a lower portion of the tubular body while it has the discharge section for discharging the wash liquid at an upper portion thereof, thereby allowing the washing liquid to come into contact with the powdery and/or granular resin which is naturally descending due to gravity in the direction opposite to the direction in which the washing liquid is forcibly flown.

Thus, the present invention can also be said to be based on the novel finding that the static mixer can be used in the field of washing a substance while two substances are allowed to flow through the static mixer in a counterflow fashion. In other words, the present invention takes advantage of the feature of the static mixer in the washing operation as well as in the mixing operation and furthermore adds new improvements to the static mixer to thereby form a washing device which is highly efficient in washing and which has equipment simplified.

Referring now to FIG. 1 which shows a preferred embodiment of the washing device according to the present invention, which has a tubular body in a vertical shape.

As shown in FIG. 1, the washing device comprises a tubular body 2 having a built-in element 1 similar to that as shown in FIG. 3, which in turn is provided at the upper portion thereof with a supply section 3 for supplying the powdery and/or granular resin and a discharge section 4 for discharging the wash liquid and at the lower portion thereof with a discharge section 5 for discharging the powdery and/or granular resin and a supply section 6 for supplying the washing liquid. The discharge section 5 may usually have an ejection valve such as a rotary valve. In the drawing, reference numerals 7 and 8 denote filters disposed in an appropriate fashion.

In the washing device as shown in FIG. 1, for instance, the solvent is separated from the reaction mixture containing the powdery and/or granular resin by the filter 7 and the powdery and/or granular resin containing impurities is then led from the supply section 3 to the washing device. On the other hand, deionized water to be used as the washing liquid is fed from the supply section 6 located at the lower portion of the tubular body and is allowed to flow in the direction opposite to the flow of the powdery and/or granular resin. More specifically, in the washing device in a vertical shape according to the preferred embodiment of the present invention, the powdery and/or granular resin is washed with the washing liquid while being descending in constant contact with the washing liquid which is fed from the supply section 6 located at the lower portion of the tubular body and then allowed to ascend through the tubular body.

The powdery and/or granular resin is withdrawn from the discharge section 5 of the tubular body after it has been washed with the washing liquid supplied in a counterflow fashion. On the other hand, the wash liquid, such as deionized water, containing impurities is discharged from the discharge section 4 of the tubular body and the impurities are then removed by the filter 8.

Figure 2:
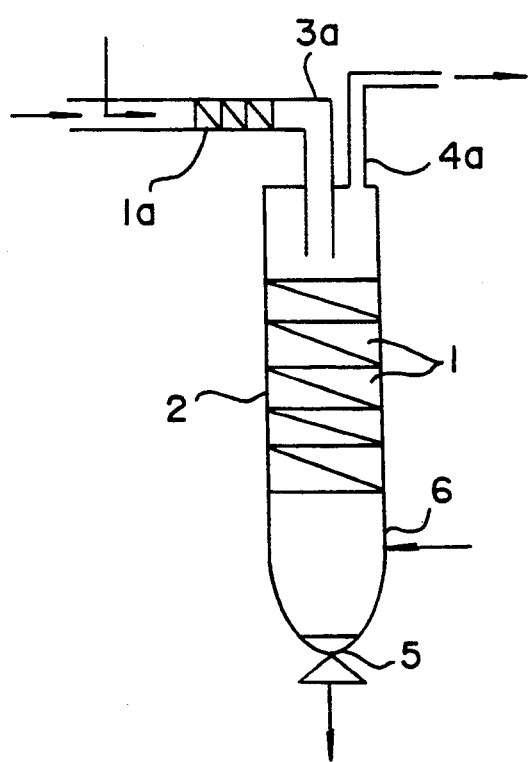

FIG. 2 shows a tubular body having substantially the same structure as that as shown in FIG. 1, except for the provision of a discharge section 4a for discharging the washing liquid at a top portion of the tubular body and the provision of a built-in spiral element 1a in a supply tube 3a for supplying the powdery and/or granular resin. With the washing device of the structure as described immediately hereinabove, the powdery and/or granular resin is supplied through the supply tube 3a with the built-in spiral element 1a together with the washing liquid, thereby allowing the powdery and/or granular resin to be washed in a preliminary fashion.

When polyarylene sulfide having an average particle size ranging from 500 to 5,000 microns is used as the powdery and/or granular resin, the washing device having the vertically shaped tubular body may preferably have the structure which follows, and the washing may preferably be implemented under the following conditions.

Height of tubular body: 100–1,000 cm

Inner diameter of annular body: 5-50 cm
Length of each spiral element in a clockwisely or counterclockwisely twisted shape: 5-50 cm
Twisted angle of each spiral element in a clockwisely or counterclockwisely twisted shape: 30-180°
Alignment of spiral elements: spiral element in a clockwisely twisted shape arranged alternately arranged with spiral element in a counterclockwisely twisted shape.
Kind of washing liquid: deionized water
Temperature of washing liquid: 20-80° C.
Rate of washing liquid as linear velocity of washing liquid in the upward flow: 0.1-1,000 mm/sec
Rate of powdery and/or granular resin to rate of washing liquid: 0.01-10 wt/wt.

As is apparent from the foregoing description, the washing process according to the present invention can achieve a very high efficiency in washing the powdery and/or granular resin by using the washing device with a simplified structure. In particular, for example, the content of impurities, e.g., sodium chloride, remaining in the powdery and/or granular resin, e.g., polyarylene sulfide in a powdery and/or granular form, can be reduced to a level ranging from 1/10 to 1/1000 with respect to the original level of the impurities by appropriately selecting the conditions for washing.

In summary, the present invention can provide the process for washing the powdery and/or granular resin and the washing device for use in the process therefor, which are highly efficient in washing, which require merely simplified equipment, which runs at a very cheap running cost, and which is readily operative.

The present invention will be described more in detail by way of examples with reference to comparative examples.

EXAMPLE 1

Preparation of PPS in powdery and/or granular form:

A reaction vessel equipped with a fractionating tower was charged with 500 liters of N-methyl-2-prryolidone (NMP), 0.83 kg-mole of sodium sulfide pentahydrate ($Na_2S \cdot 5H_2O$) and 0.83 kg-mole of lithium chloride (LiCl), and the mixture was dehydrated at the top column pressure of 100 Torr and the temperature of 130-145° C. for 1-2 hours. After cooling, 0.82 kg-mole of p-dichlorobenzene (PDCB) was charged in the reaction vessel, and the resulting mixture was reacted at 260° C. for 3 hours. The resulting reaction mixture was cooled to give a product containing polyphenylene sulfide in a powdery and/or granular form as a reaction production.

Washing of PPS in powdery and/or granular form:

The resulting reaction product was then fed through the filter 7 of the washing device as shown in FIG. 1 and the NMP as the solvent was separated from the reaction product. The PPS in powdery and/or granular form was found to have particle sizes ranging from 500 to 5,000 μm and an average particle size of 2,000 μm. Then the PPS in powdery and/or granular form was fed to the washing device through the supply section 3 and washed under the following washing conditions:

a) Conditions of washing device:
Filter 7: 32 mesh
Static mixing element 1:
Static mixer having height of 60 cm ("Thruzer"; Sumitomo Heavy Machinery Ind., Co., Ltd.; height of one unit: 5 cm; diameter of unit; 5 cm)

b) Conditions of washing:
Temperature of washing: 22° C.
Washing liquid: deionized water
Rate of washing liquid: 1,000 grams of deionized water per minute
Rate of PPS in powdery and/or granular form: 200 grams per minute The results of washing ore shown in Table below. In Table below, the content of impurities in the unwashed PPS in powdery or granular form is also indicated for comparative purpose.

EXAMPLE 2

The procedure of Example 1 was followed in substantially the same fashion except for using the static mixer having the height of 120 cm.

The results of washing are shown in Table below.

EXAMPLE 3

The procedure of Example 1 was followed in substantially the same fashion except for using the static mixer having the height of 180 cm. The results of washing are shown in Table below.

COMPARATIVE EXAMPLE 1

The procedure of Example 1 was followed in substantially the same manner, with the exception that 80 kg of the PPS in powdery or granular form was charged together with 375 kg of deionized water, prior to washing, into a washing vessel with a stirring blade, the mixture was stirred at the temperature of 22° C. for one hour, and then the mixture was filtered to allow deionized water only to pass through. This operation was repeated twice and the mixture was washed three times in a batchwise fashion. The results of washing are shown in Table below.

COMPARATIVE EXAMPLE 2

The procedure of Example 1 was followed in substantially the same manner, without using the static mixer.

In this case, it was found that the speeds of sedimentation in final stage have differed among particle sizes of the PPS in powdery and/or granular form. The PPS having the particle size of 1 mm has descended at the rate of about 5 cm per second, and the PPS having the particle size of 5 mm has descended at the rate of about 21 cm per second. This roughly means that the latter has been retained within the washing device 4 times longer than the former, and no homogeneous flow of the resin could be given. Furthermore, the effect of washing was too insufficient to be industrially applicable.

TABLE

|  | Amount of Remaining Na+ | Height of Static Mixer (cm) |
|---|---|---|
| Unwashed PPS | 1.47% | — |
| Example 1 | 170 ppm | 60 |
| Example 2 | 59 ppm | 120 |
| Example 3 | 34 ppm | 180 |
| Comparative Example 1 | 210 ppm | — |

It is found from the Table above that the PPSs in powdery and/or granular form obtained in the Examples 1 to 3 where the process according to the present invention was applied contain lesser amounts of remaining sodium than that obtained in Comparative Example 1 where conventional washing was implemented. It is further noted from the results of Examples 1 to 3 that the longer the height of the static mixer the lesser the content of remaining sodium. This seems to be based on the fact that the PPS in powdery and/or granular form is brought into contact with the washing liquid for longer periods of time as the height of the static mixer gets longer.

This remarkable effect may be achieved by forming a flow in a homogeneously dispersed state even if the powdery and/or granular form would have a considerably broad distribution of particle sizes and by always contacting the powdery and/or granular resin with the salt content reduced by washing with the fresh washing liquid.

What is claimed is:

1. A process for washing a powdery and/or granular resin comprising; contacting said resin with a washing liquid in a countercurrent fashion in a tubular body with a plurality of static mixing elements comprising first, continuous clockwise spiral, static mixing element means, and second, continuous counterclockwise spiral, static mixing element means, wherein both of said mixing elements are disposed in series in alternating relationship, wherein each of said spiral elements comprises flute means disposed at an angle of about 30 to 180°, and wherein the ends of said flute means of each of said mixing elements intersect with the end of the flute means of the next series mixing element at an angle of about 30° to 90°.

2. A process as claimed in claim 1, wherein the tubular body is disposed in a substantially vertical fashion.

3. A process as claimed in claim 1, wherein the powder and/or granular resin comprises a polyarylene sulfide.

4. A process as claimed in claim 1, wherein said powdery and/or granular resin has an average particle size ranging from 500 to 5,000 microns.

5. A process as claimed in claim 2, wherein said powdery and/or granular resin is obtained by removing a solvent after polymerization of polyarylene sulfide precursors, and sodium chloride.

6. A process as claimed in claim 1, wherein the washing liquid is deionized water.

7. A process for washing a powder and/or granule comprising polyarylene sulfide comprising:

supplying deionized water at a linear velocity of 0.1–1,000 mm/sec in the upward flow to a lower portion of a tubular body of a vertically disposed device;

supplying said powder for granule of polyarylene sulfide, having an average particle size ranging from 500 to 5,000 μm, at a rate 0.01–10 times by weight, as large as the rate of supply of said washing liquid, to an upper portion of a tubular body of said washing device;

passing said powder and/or granules counter current to said deionized water in contact with clockwisely twisted spiral element means having a twisted angle ranging 30° to 180°, which clockwise element means is disposed alternately and continuously in series with counterclockwisedly twisted spiral element means, wherein the ends of said spiral element means intersect at an angle of about 30° to 90°, and wherein said tubular body has a length of 100 cm to 1,000 cm and an inner diameter of 5 cm to 50 cm.

8. A washing device for washing a powdery and/or granular resin comprising an tubular body with a plurality of static mixing elements disposed continuously in series; wherein the tubular body has a supply section for supplying the powdery and/or granular resin and a discharge section for discharging a washing liquid at a portion of the tubular body and a supply section for supplying the washing liquid and a discharge section for discharging the powdery and/or granular resin at another portion of the tubular body.

9. A washing device as claimed in claim 8, wherein each of the static mixing elements is a spiral element.

10. A washing device as claimed in claim 8, wherein the static mixing element comprises a spiral element twisted in a clockwise direction at a twisted angle ranging from 30° to 180° and a spiral element twisted in a counterclockwise direction at an angle ranging from 30° to 90°.

11. A washing device as claimed in claim 8, wherein the tubular body having a height ranging from 100 cm to 1,000 cm and an inner diameter ranging from 5 cm to 50 cm is disposed in a substantially vertical direction and has a spiral element twisted in a clockwise direction at a twisted angle ranging from 30° to 180° disposed continuously in series at an intersecting angle ranging from 30° to 90° with a spiral element twisted in a counterclockwise direction at a twisted angle in the same range as the spiral element twisted in a clockwise direction.

12. A process as claimed in claim 1 wherein the angles of the flutes of both spiral elements are substantially the same.

* * * * *